(12) United States Patent
Beaurepaire

(10) Patent No.: US 9,518,836 B2
(45) Date of Patent: Dec. 13, 2016

(54) DISPLAYING ELEMENTS

(75) Inventor: Jerome Beaurepaire, Berlin (GB)

(73) Assignee: HERE GLOBAL B.V., Eindhoven (NL)

( * ) Notice: Subject to any disclaimer, the term of this patent is extended or adjusted under 35 U.S.C. 154(b) by 63 days.

(21) Appl. No.: 13/486,870

(22) Filed: Jun. 1, 2012

(65) Prior Publication Data

US 2013/0321269 A1    Dec. 5, 2013

(51) Int. Cl.
*G06F 3/0346*    (2013.01)
*G01C 21/36*    (2006.01)

(52) U.S. Cl.
CPC ................................. *G01C 21/3682* (2013.01)

(58) Field of Classification Search
CPC .................................................. G01C 21/3682
USPC ... 701/426, 455; 715/810; 340/995.1–995.28
See application file for complete search history.

(56) References Cited

U.S. PATENT DOCUMENTS

| | | | | |
|---|---|---|---|---|
| 2001/0026276 A1* | 10/2001 | Sakamoto | .......... | G01C 21/3638 345/473 |
| 2004/0176906 A1* | 9/2004 | Matsubara | .......... | G01C 21/3608 701/432 |
| 2004/0204821 A1* | 10/2004 | Tu | ...................... | G01C 21/3679 701/527 |
| 2004/0243306 A1* | 12/2004 | Han | .................... | G01C 21/3682 701/438 |
| 2009/0055774 A1* | 2/2009 | Joachim | ................ | G06F 3/0483 715/810 |

FOREIGN PATENT DOCUMENTS

| | | |
|---|---|---|
| EP | 2 023 088 A2 | 2/2009 |
| JP | 2010/238098 A | 10/2010 |
| JP | 2010238098 A | * 10/2010 |

OTHER PUBLICATIONS

Google Earth, Google Inc. [online] [retrieved Jun. 4, 2012]. Retrieved from the Internet: <URL: http://www.google.com/earth/index.html>. 1 page.
Google Earth, Google Inc. [online] [retrieved Jun. 4, 2012]. Retrieved from the Internet: <URL: http://www.google.com/earth/explore/products/>. 1 page.
Google Earth, Google Inc. [online] [retrieved Jun. 4, 2012]. Retrieved from the Internet: <URL: http://www.google.com/earth/explore/products/desktop.html>. 2 pages.

(Continued)

*Primary Examiner* — Kent Chang
*Assistant Examiner* — Mark Edwards
(74) *Attorney, Agent, or Firm* — Alston & Bird LLP

(57) ABSTRACT

Apparatus comprises at least one processor, and at least one memory including computer program code, wherein the at least one memory and the computer program code are configured to, with the at least one processor, cause the apparatus to cause a plurality of elements to be displayed in respective positions on a map, to determine a section of the map based upon one or more conditions, to determine that two or more of the elements are positioned in or near to the section of the map and are spaced closer together than a threshold spacing, and, in response thereto, to cause a perceptible output to be provided to further distinguish each of the two or more elements from one another.

20 Claims, 12 Drawing Sheets

(56) References Cited

OTHER PUBLICATIONS

Google Earth, Google Inc. [online] [retrieved Jun. 4, 2012]. Retrieved from the Internet: <URL: http://www.google.com/earth/downgrade/ge/>. 1 page.
Google Earth, Google Inc. [online] [retrieved Jun. 4, 2012]. Retrieved from the Internet: <URL: http://www.support.google.com/earth/bin/answer.py?hl=en&answer=176145&topic=2376010&ctx=topic>. 1 page.
Google Earth, Google Inc. [online] [retrieved Jun. 4, 2012]. Retrieved from the Internet: <URL: http://www.support.google.com/earth/bin/answer.py?hl=en&answer=40901&topic=2376010&ctx=topic>. 2 pages.
Google Earth—Wikipedia, the free encyclopedia [online] [retrieved Jun. 4, 2012]. Retrieved from the Internet: <URL: http://www.en.wikipedia.org/wiki/Google_Earth>. 12 pages.
International Search Report and Written Opinion for Application No. PCT/EP2013/060830, dated Aug. 28, 2103.

\* cited by examiner

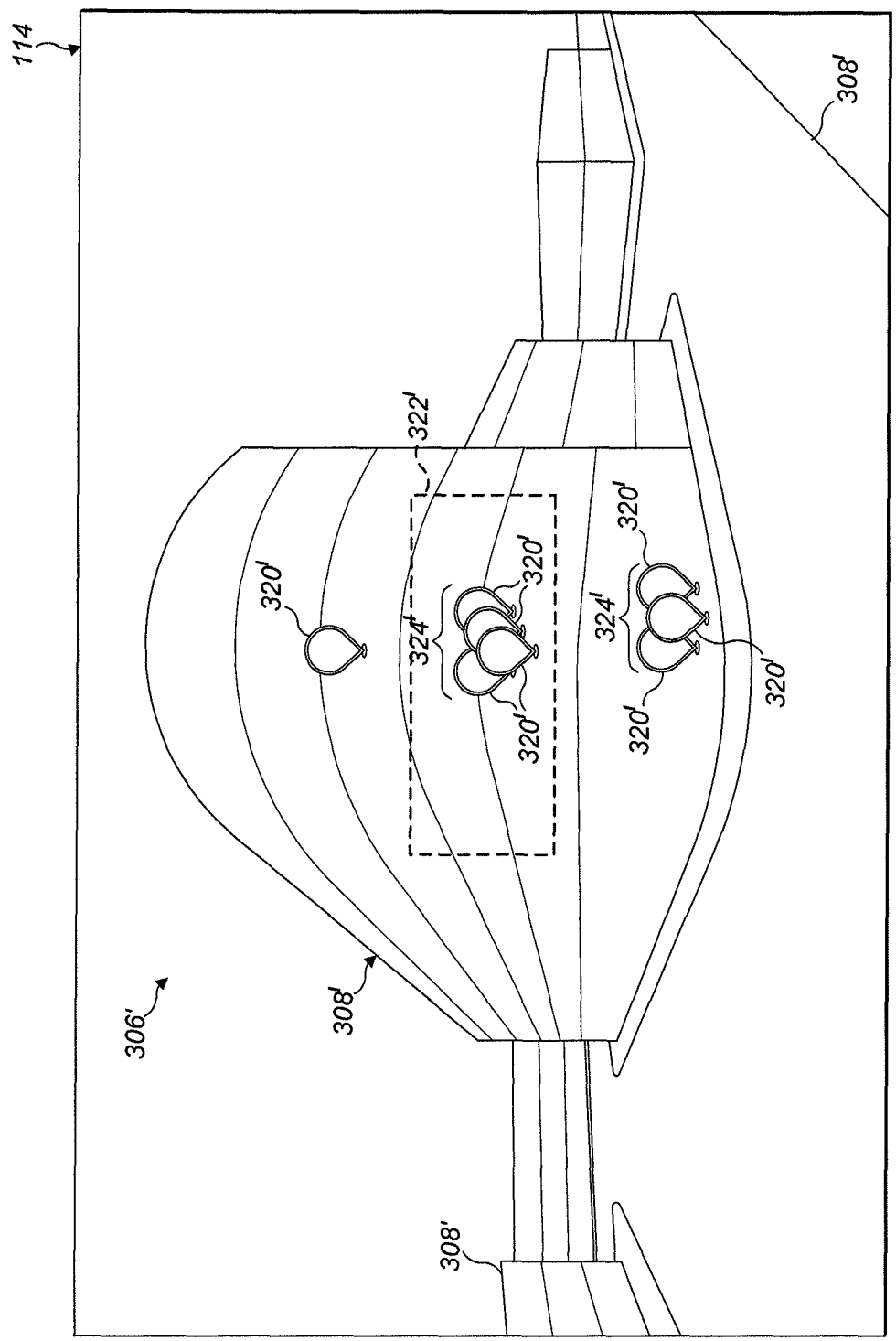

DISPLAYING ELEMENTS

FIELD

The specification relates to a method, apparatus and computer program for displaying elements.

BACKGROUND

Electronic devices are often provided with mapping functionality to allow users to view geographical information and perform various related actions. Among other things, the geographical information may include points of interests.

SUMMARY

In a first aspect, the specification describes apparatus comprising at least one processor and at least one memory including computer program code, wherein the at least one memory and the computer program code are configured to, with the at least one processor, cause the apparatus to cause a plurality of elements to be displayed in respective positions on a map, to determine a section of the map based upon one or more conditions, to determine that two or more of the elements are positioned in or near to the section of the map and are spaced closer together than a threshold spacing, and, in response thereto, to cause a perceptible output to be provided to further distinguish each of the two or more elements from one another.

The at least one memory and the computer program code may be configured to, with the at least one processor, cause the apparatus to cause the perceptible output to be provided by causing at least one of the two or more elements to be displayed at a different position such that the two or more elements are spaced further apart.

The one or more conditions may include a position and/or a direction, preferably wherein the position is a current position of a device determined from positioning information and preferably wherein the direction is a direction of movement of the device determined from a position history or the direction is a direction of orientation of the device determined from orientation information.

The section of the map may be one-dimensional or an elongated two- or three-dimensional region starting at or near to the position and extending lengthwise in the direction.

The at least one memory and the computer program code may be configured to, with the at least one processor, cause the apparatus to determine the size of the section of the map based upon the number of elements that are positioned in or near to the section of the map, wherein the size is decreased as the number of elements increases.

The threshold spacing may correspond to a predetermined distance between each of the two or more elements and at least one other of the two or more elements.

The at least one memory and the computer program code may be configured to, with the at least one processor, cause the apparatus to cause the section of the map to be displayed.

The at least one memory and the computer program code may be configured to, with the at least one processor, cause the apparatus, in response to determining that the two or more elements are positioned in or near to the section of the map and are spaced closer together than the threshold spacing, to cause an indication thereof to be displayed, to detect a user input, and, in response thereto, to cause the perceptible output to be provided.

The at least one memory and the computer program code may be configured to, with the at least one processor, cause the apparatus, in response to determining that the two or more elements are positioned in or near to the section of the map and are spaced closer together than the threshold spacing, to cause the perceptible output to be provided without any user input.

The at least one memory and the computer program code may be configured to, with the at least one processor, cause the apparatus to detect a user input in relation to one of the two or more elements in relation to which the perceptible output was provided, and, in response thereto, to perform a related action.

In a second aspect, the specification describes a method comprising causing a plurality of elements to be displayed in respective positions on a map, determining a section of the map based upon one or more conditions, determining that two or more of the elements are positioned in or near to the section of the map and are spaced closer together than a threshold spacing, and, in response thereto, causing a perceptible output to be provided to further distinguish each of the two or more elements from one another.

Causing the perceptible output to be provided may comprise causing at least one of the two or more elements to be displayed at a different position such that the two or more elements are spaced further apart.

The one or more conditions may comprise a position and/or a direction, preferably wherein the position is a current position of a device determined from positioning information and preferably wherein the direction is a direction of movement of the device determined from a position history or the direction is a direction of orientation of the device determined from orientation information.

The section of the map may be a one-dimensional or an elongated two- or three-dimensional region starting at or near to the position and extending lengthwise in the direction.

The method may comprise determining the size of the section of the map based upon the number of elements that are positioned in or near to the section of the map, wherein the size is decreased as the number of elements increases.

The method may comprise causing the section of the map to be displayed.

The method may comprise, in response to determining that the two or more elements are positioned in or near to the section of the map and are spaced closer together than the threshold spacing, causing an indication thereof to be displayed, detecting a user input, and, in response thereto, causing the perceptible output to be provided.

The method may comprise, in response to determining that the two or more elements are positioned in or near to the section of the map and are spaced closer together than the threshold spacing, causing the perceptible output to be provided without any user input. The method may comprise detecting a user input in relation to one of the two or more elements in relation to which the perceptible output was provided, and, in response thereto, performing a related action.

In a third aspect, the specification describes a non-transitory computer-readable storage medium having stored thereon computer-readable code, which, when executed by computer apparatus, causes the computer apparatus: to cause a plurality of elements to be displayed in respective positions on a map, to determine a section of the map based upon one or more conditions, to determine that two or more of the elements are positioned in or near to the section of the map and are spaced closer together than a threshold spacing, and, in response thereto, to cause a perceptible output to be provided to further distinguish each of the two or more elements from one another.

In a fourth aspect, the specification describes apparatus comprising means for causing a plurality of elements to be displayed in respective positions on a map, means for determining a section of the map based upon one or more conditions, means for determining that two or more of the elements are positioned in or near to the section of the map and are spaced closer together than a threshold spacing, and, means, responsive thereto, for causing a perceptible output to be provided to further distinguish each of the two or more elements from one another.

In a fifth aspect, the specification describes apparatus configured to perform the method.

In a sixth aspect, the specification describes a computer program comprising instructions which, when executed by a processor, cause the processor to perform the method.

BRIEF DESCRIPTION OF THE DRAWINGS

For a more complete understanding of example embodiments, reference is made to the detailed description and the accompanying drawings in which:

FIGS. 6a, 6b, 6c and 6d illustrate aspects of a further method which may be performed by the controller of the apparatus of FIG. 1.

DETAILED DESCRIPTION

Figure 1:
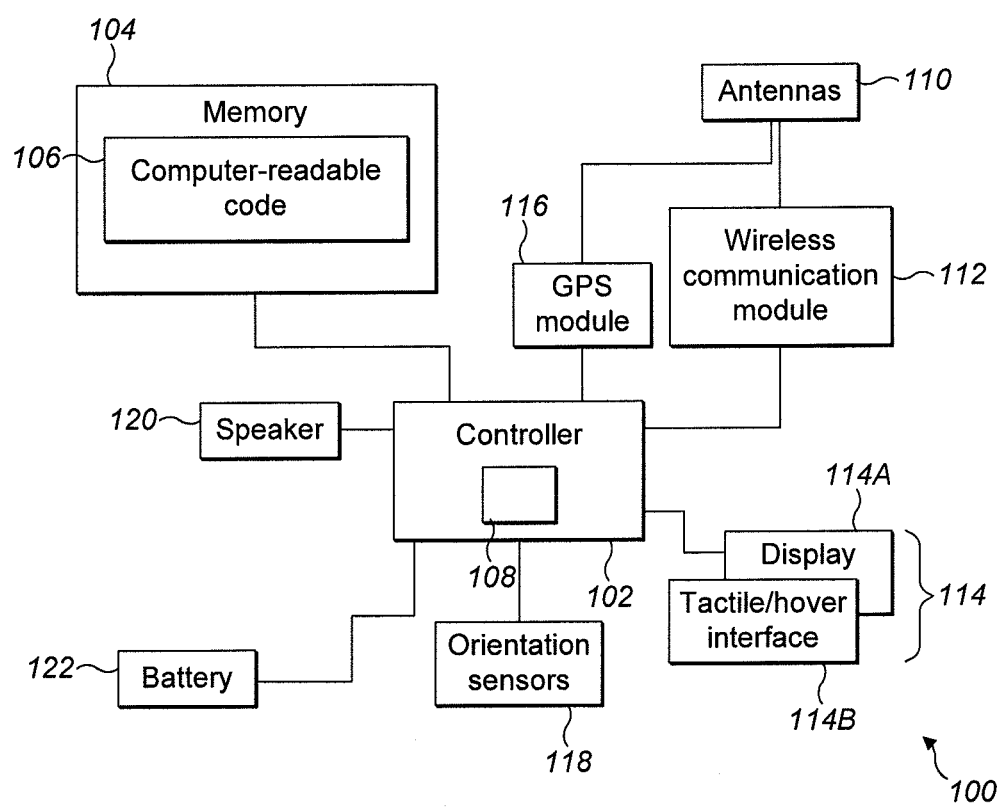
FIG. 1 is a simplified schematic of an apparatus in accordance with example embodiments.

In the description and drawings, like reference numerals refer to like elements throughout.

FIG. 1 is a simplified schematic of apparatus 100 in accordance with example embodiments.

The apparatus 100 comprises a controller 102 and at least one non-transitory memory medium 104. The controller 102 is operable, under the control of computer readable code 106 stored on the at least one memory medium 104, to control the various other components of the apparatus 100. The controller 102 comprises at least one processor 108 which is configured to execute the computer readable code 106 and thereby to cause actions to be performed by the other components. The controller 102 may also comprise one or more application specific integrated circuits (not shown). The at least one non-transitory memory medium 104 comprises one or more discreet memory media such as, but not limited to, ROM, RAM, flash memory and optical storage.

The apparatus 100 may be part of a wireless communication device such as a mobile telephone or smartphone, a personal digital assistant, a portable media player, a tablet computer, a laptop computer, a gaming console, a desktop computer, or any other type of portable or non-portable wireless communication device. As such, in this example, the apparatus 100 comprises one or more antennas 110 and a wireless communication module 112. The one or more antennas 110 and the wireless communication module 112 are operable under the control of the controller 102 to engage in wireless communication. The one or more antennas 110 and the wireless communication module 112 may be configured to operate using any appropriate wireless communication protocol. Such protocols include, but are not limited to, GSM, CDMA, UMTS, Bluetooth and IEEE 802.11 (Wi-Fi).

The apparatus 100 may also comprise a user interface 114 including a display 114A and a user-input interface 114B. The user-input interface 114B may be of any appropriate type including, but not limited to, a touch and/or hover interface and/or one or more mechanical keys. The user interface 114 is operable under the control of the controller 102. As such, the controller 102 may be configured to send signals to the display 114A so as to cause images to be displayed on the display 114A. The controller 10 may also be operable to receive signals indicative of user inputs from the user input-interface 114B and to cause actions to occur in accordance with user inputs.

The apparatus 100 may comprise a GPS or other satellite navigation system module 116 for receiving GPS positioning information. The apparatus may comprise orientation sensors 118 such as an accelerometer, a magnetometer and/or a gyroscope for producing orientation information.

The apparatus 100 may comprise one or more other components including, but not limited to, a speaker 120 for providing audio outputs to the user and a battery 122 for providing power to the apparatus 100. It will also be appreciated that the apparatus 100 may comprise other components such as one or more cameras (not shown), etc.

Figure 2:
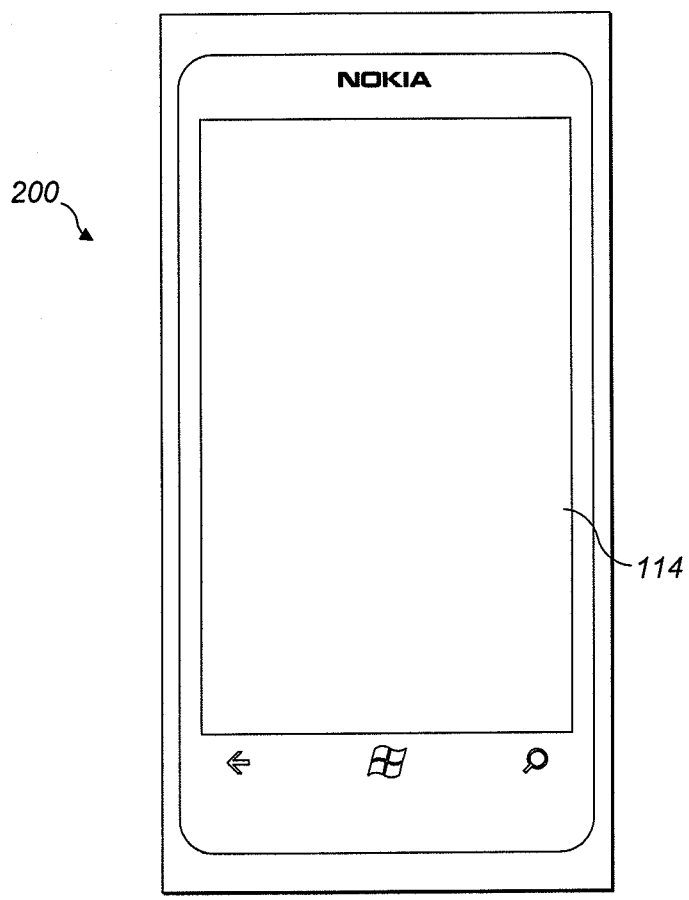
FIG. 2 is a front-on view of a wireless communication device comprising the apparatus of FIG. 1.

FIG. 2 is a front-on view of a portable wireless communication device 200 which comprises apparatus 100 in accordance with example embodiments, such as that shown in FIG. 1. The user interface 114 is visible from the exterior of the wireless communication device 200, and in this example comprises a display 114A and a touch interface 114B.

Figure 3A:
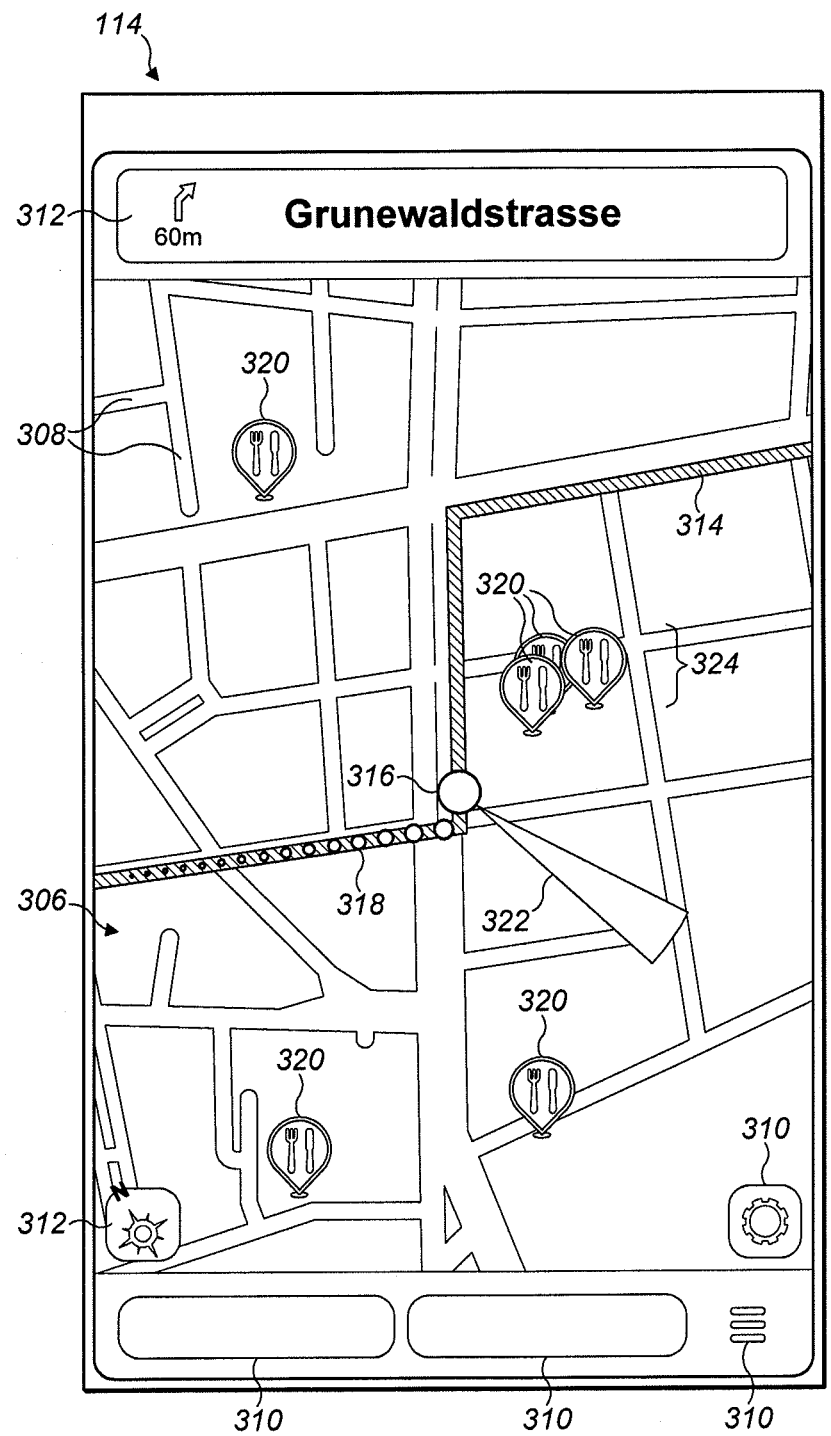
FIGS. 3a, 3b and 3c illustrate aspects of a method which may be performed by the controller of the apparatus of FIG. 1.
Figure 3B:
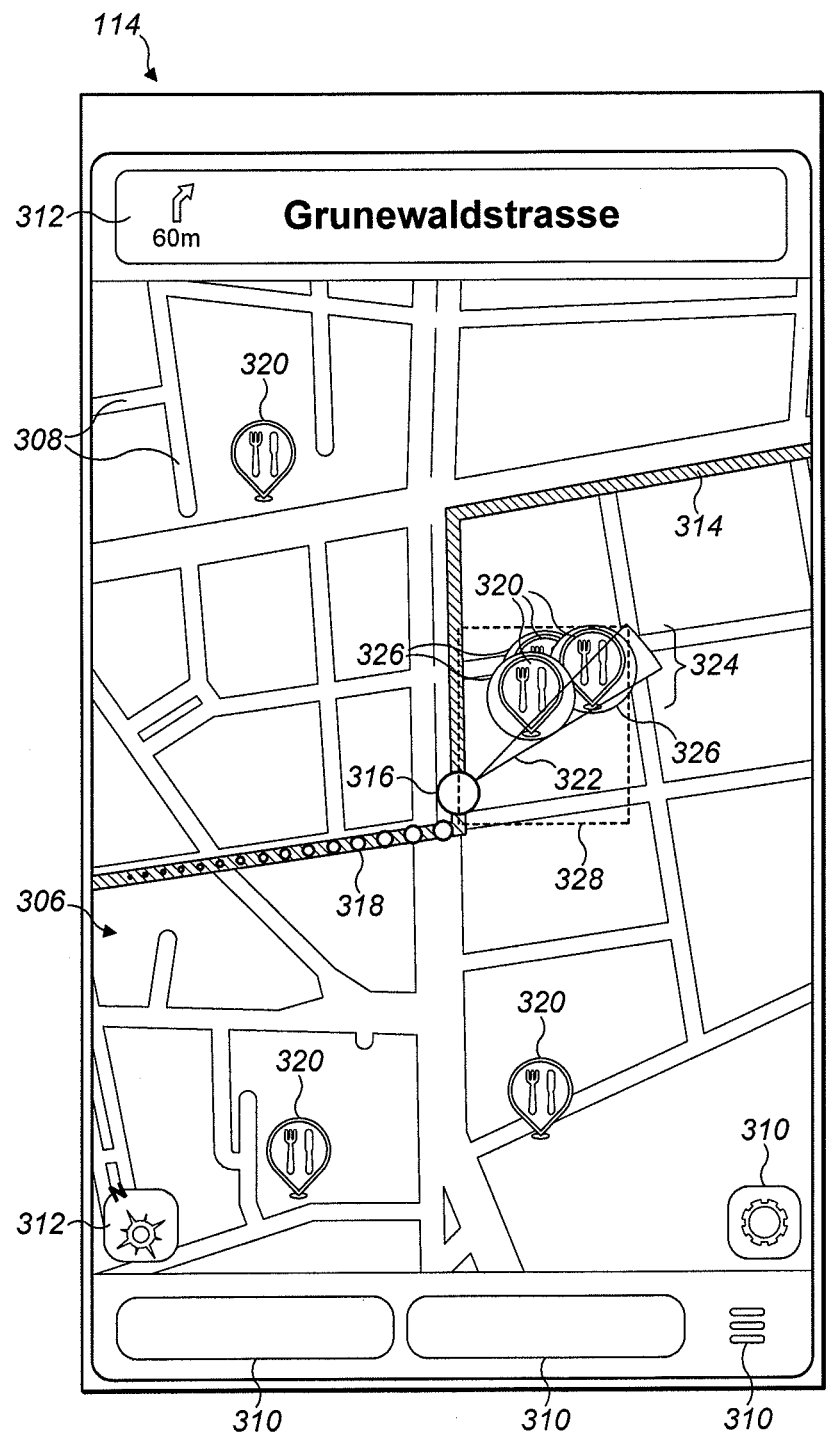
Figure 3C:
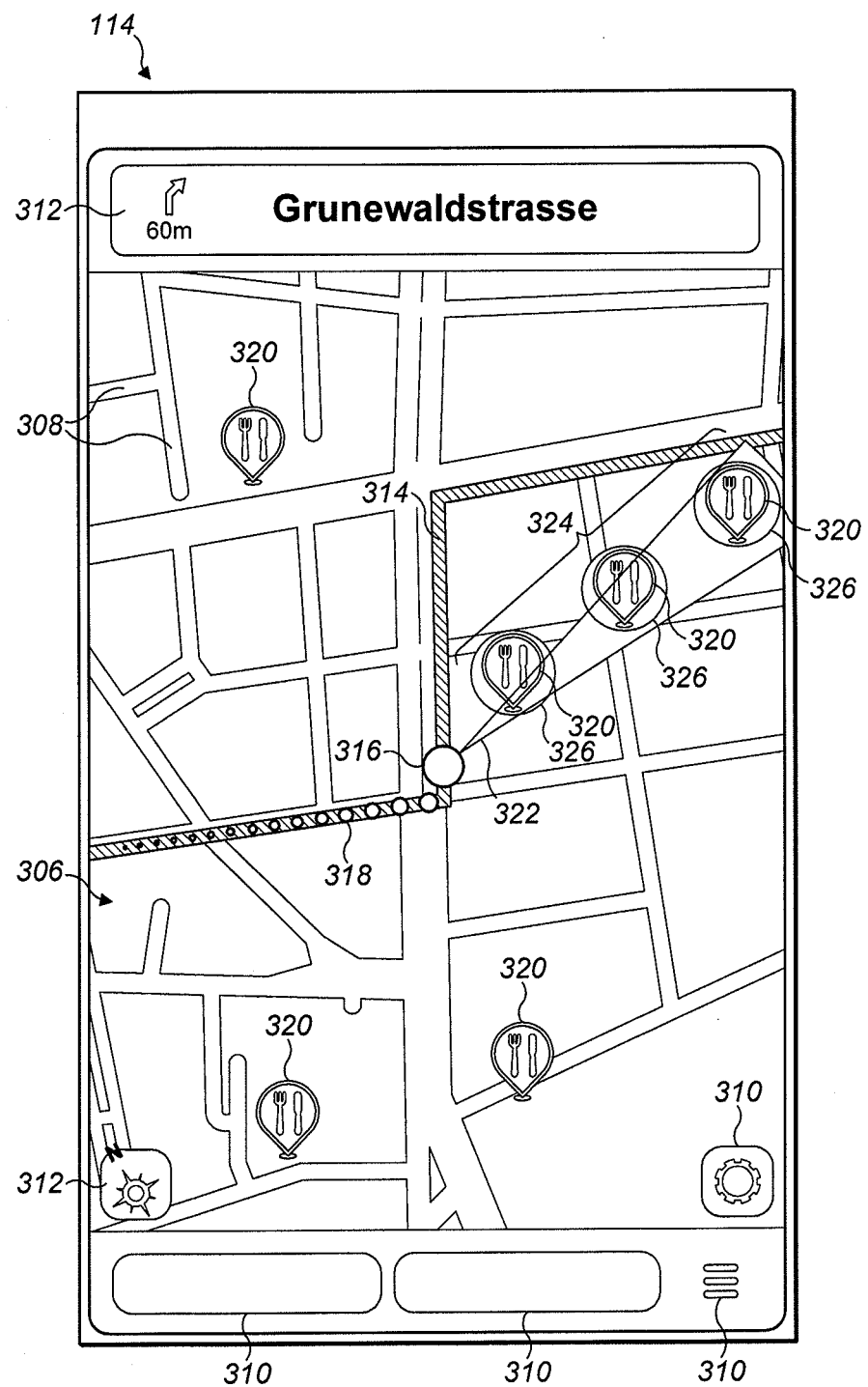

Referring to FIGS. 3a, 3b and 3c, the user interface 114 may display a part of a map 306. The map 306 may represent a geographical area. The part of the map 306 that is displayed may be determined by the user, for example by zooming or scrolling the map 306 by making appropriate inputs on the touch interface 114B. The part of the map 306 that is displayed may also be determined automatically, for example based on GPS and/or other types of positioning information.

The information used when displaying the map 306 may be obtained from the memory 104 and/or from another source such as a remote server device with which the device 200 may communicate via the one or more antennas 110 and the wireless communication module 112.

Referring in particular to FIG. 3a, the map 306 may include basic elements 308 representing, for example, geographical features, roads, buildings, etc. Alternatively or additionally, the map 306 may include satellite imagery or other types of images. The basic elements 308 may include textual and/or graphical information.

As shown in the figure, a two-dimensional plan view of the map 306 may be displayed. Alternatively or additionally, a different view of the map 306, such as a three-dimensional perspective map view or a first-person map view, may be displayed.

The user interface 114 may also display various input elements 310 and/or output elements 312. The input elements 310 may include buttons for performing operations such as zooming, accessing menus, changing map settings, setting a route, etc. The output elements 312 may include navigation information such as directions for reaching a selected destination, a compass for showing the direction of north, etc. Element 310, 312 may be for both input and output.

The user interface 114 may also display an indication 314 of a selected route between selected start and destination points on the map 306. Indications (not shown) of the selected start and destination points may also be displayed. The route 314 may be selected in any appropriate way, for example by the user directly via an input element 310 on the map or indirectly via a software application running on the device 200 and/or on a remote server device.

The user interface 114 may also display an indication 316 of the current position of the device 200 on the map 306. Indications 318 of the positions of the device 200 at respective previous times may also be displayed. As shown in the figure, the current position may be indicated by a larger element 316 and the previous positions may be indicated by smaller elements 318, wherein elements 318 associated with older points in time may be smaller than those associated with more recent points in time. However, the indications 316 and/or 318 could take any appropriate form. As will be explained in more detail below, the position of the device 200 may be determined based on GPS and/or other types of positioning information.

The user interface 114 may also display a plurality of elements 320 associated with respective positions on the map 306. Such an element 320 may be associated with a feature which may be referred to as a "point of interest". A point of interest may be associated with any type of feature on the map 306, for example any type of business or man-made or natural feature, etc. The point of interest need not relate to a physical feature but may be for associating any type of information with a point on the map 306. For example, the point of interest may relate to a photograph taken at that point or an encyclopaedia entry, user review, etc. related to that point. The point of interest may be the location of person who has provided location information to the device 200, e.g. using another electronic device and/or a social networking service. Thus, the point of interest need not be a stationary point on the map. Points of interest may be organised into categories. Such categories may include, for example, "restaurants", "bars", "ATMs", etc. The information describing the points of interest may be stored in the memory 104 of the device 200 and/or may be obtained from other devices, for example via the one or more antennas 110 and the wireless communication module 112.

The element 320 may provide an indication of the position on the map 306 of the associated point of interest. The element 320 may also provide information about the point of interest. For example, the element 320 may provide information about the category of point of interest. This may be by the element 320 including an appropriate icon. Alternatively or additionally, the element 320 may provide more specific information about the point of interest. This could be by the element 320 including textual information, such as a name, or graphical information such as an image or photograph. The figure shows only one type of element 320, namely an element 320 including a "restaurant" icon. However, as will be appreciated, the elements 320 may be of various different types and these may take any appropriate form.

The user interface 114 may provide a way for the user to control which elements 320 are displayed on the map 306. For example, a user may be provided with a menu for selecting the categories of points of interest to be displayed.

The user interface 114 may also display an indication of a map section 322. As will be explained in more detail below, the map section 322 may be used to determine which of the elements 320 that are spaced closer together than a threshold spacing are to be repositioned to make them more individually visible and/or selectable. The map section 322 may be thought of as a region of the map 306 that is potentially of interest to the user at a current time.

The map section 322 may be determined based upon one or more conditions. These may be any appropriate condition that may be used to determine the region of current potential interest. The map section 322 may be determined dynamically.

For example, the map section 322 may be determined based upon a position and a direction on the map 306.

The position may be the current position of the device 200. The current position may be determined in any appropriate way. For example, the current position may be determined by the controller 102 based upon positioning information. The positioning information may include GPS information received by the GPS module 123 or any other satellite navigation system information. Alternatively or additionally, the positioning information may include information from a cellular or other wireless network.

The direction may be the direction in which the device 200 is or has been moving. Such a direction may be determined in any appropriate way. For example, the direction may be determined by the controller 102 based upon a position history of the device 200. Such a position history may include information about the previous positions of the device 200. The previous positions may be determined as described above, e.g. based upon positioning information. The position history information may be stored in the memory 104 of the device 200 and/or elsewhere such as at remote server device.

The position history may be used in any appropriate way to obtain an appropriate direction. An average direction may be determined based upon a selection of the position history information. For example, an average direction may be determined for position history information going back a particular length of time and/or a particular distance moved. Alternatively or additionally, an average direction may be determined for position history information since a significant change in direction last occurred.

The direction may be determined at least partly based upon the basic features 308 of the map 306. For example, in some circumstances, the device 200 may be assumed to be travelling either one way or another along a road 308 on or near to which it is positioned.

Alternatively or additionally, the direction may be the current direction in which the device 200 is facing or is orientated. This may be determined in any appropriate way. For example, the direction may be determined using orientation information from the one or more orientation sensors 118.

In some examples, the position and/or the direction may be determined in other ways. For example, the position and/or the direction may be input by the user. The input could involve, for example, touching the screen 114 at the position and/or swiping across the screen 114 in the direction. Alternatively, the position and/or the direction may be determined based upon information obtained from a software application running on the device 200 and/or on a remote server device.

Once the position and the direction have been determined, the map section 322 may then be determined in any appropriate way.

For example, the map section 322 may be an elongated region starting at or near to the position and extending lengthwise in the direction. For example, as shown in the figure, the map section 322 may be a sector of a circle centred at the position. Other possible shapes include a triangle, rectangle, line, etc.

The size of the map section 322 may be determined in any appropriate way.

The width and/or the length of the map section 322 may be set to predetermined values. For example, if the map section 322 is a sector of a circle as described above, then this may have a predetermined angular width, i.e. a number of degrees such as 15°. Furthermore, the width and/or the length may be set to a predetermined distance on the map 306, e.g. a number of meters, or a predetermined distance on the display 114, e.g. a number of pixels.

The width and/or the length of the map section 322 may also be varied dynamically. For example, the width and/or length may be decreased as the number of elements 320 positioned in or near to the map section 322 increases and vice versa. This may involve there being a target number or range of numbers of elements 320 in the map section 322. Thus, for example, an overcrowding of the screen may be avoided when the elements 320 in or near to the map section 322 are spaced further apart (as described below).

The width and/or length may also depend upon other conditions, such as the speed of movement of the device 200, recent variability of such movement, etc. The width and/or length may also be varied between predetermined maximum and/or minimum values. The length of the map section 322 may also be such that it always extends to the edge of the part of the map 306 that is being displayed.

The width and/or length may also be set by the user.

The indication of the map section 322 need not show any or all of the boundaries of the map section 322. For example, a mere indication of the direction in which the map section 322 extends may be displayed. Such an indication could be provided in place of the indication 316 of the current position of the device 200. The indication of the map section 322 does not need to be displayed at all. There may also be a way for the user to control whether or not the indication of the map section 322 is displayed.

As mentioned above, the map section 322 may be used to identify the elements 320 which are to be spaced further apart. This may involve determining that two or more of the elements 320 are positioned in or near to the map section 322. In this case, an element 320 may be considered as being sufficiently near to the map section 322 if it is positioned within a predetermined distance thereof. The predetermined distance may be a distance on the map 306 or on the display 114.

The one or more groups of elements 320 that are positioned in or near to the map section 322 and are also spaced closer together than a threshold spacing may then be identified. Such a group of closely-spaced elements 320 may be referred to as a stack 324. The elements 320 included in a stack 324 may be identified in any appropriate way. For example, an element 320 may be identified as part of a stack 324 if it is positioned within a predetermined distance of at least one other element 320 in the stack 324. The predetermined distance may be a distance on the map 306 or on the display 114. The predetermined distance may also be varied, for example in dependence upon the type of element 320, user settings, etc. At any time, the map section 322 may include no stacks 324, one stack 324 or more than one stack 324.

Referring in particular to FIG. 3*b*, the user interface 114 may highlight 326 or otherwise display an indication of which of the elements 320 have been identified. The indication 326 may relate to an individual elements 320 or to a stack 324 thereof.

The identified elements 320 may then be spaced further apart as described below without any user input being required. In this way, the spacing apart of the elements 320 may be performed largely automatically. It may be required that the identified elements 320 remain in the map section 322 for a predetermined period of time before they are spaced apart. Alternatively, a user input may be required in order to proceed. For example, as shown in the figure, an outline 328 around the stack 324 may be displayed and a user input inside the outline 328 may be required. In this way, the user may have more control over the spacing apart of the elements 320. For example, the user may decide not to do so. In addition, if the map section 322 includes two or more stacks 324, then the user may identify which one or more of these stacks 324 are to be expanded as described below.

Referring particularly to FIG. 3*c*, the identified elements 320 may be spaced further apart or, in other words, expanded in any appropriate way.

For example, as shown in the figure, at least one of the identified elements 320 may be repositioned such that they are distributed along a line. The line may start at or near to the position used to determine the map section 322 (e.g. the current position of the device 200) and may extend in the direction used to determine the map section 322 (e.g. a direction of movement or the current direction of orientation of the device 200). The elements 320 may be evenly distributed along the line with an appropriate spacing between the elements 320. If there are more elements 320 than may be accommodated on such a line, then more than one such line of elements 320 may be displayed. Alternatively, only a subset of the elements 320 may be displayed at any one time and the user may display the remaining elements 320 by making an appropriate input.

Alternatively, the elements 320 could be displayed in a one-dimensional arrangement, e.g. along a line such as a straight line or the periphery of a circle or an ellipse, in a two-dimensional array or any other appropriate arrangement in the vicinity of their original position or in any other part of the display 114, e.g. at the top or bottom of the display 114.

Figure 4:
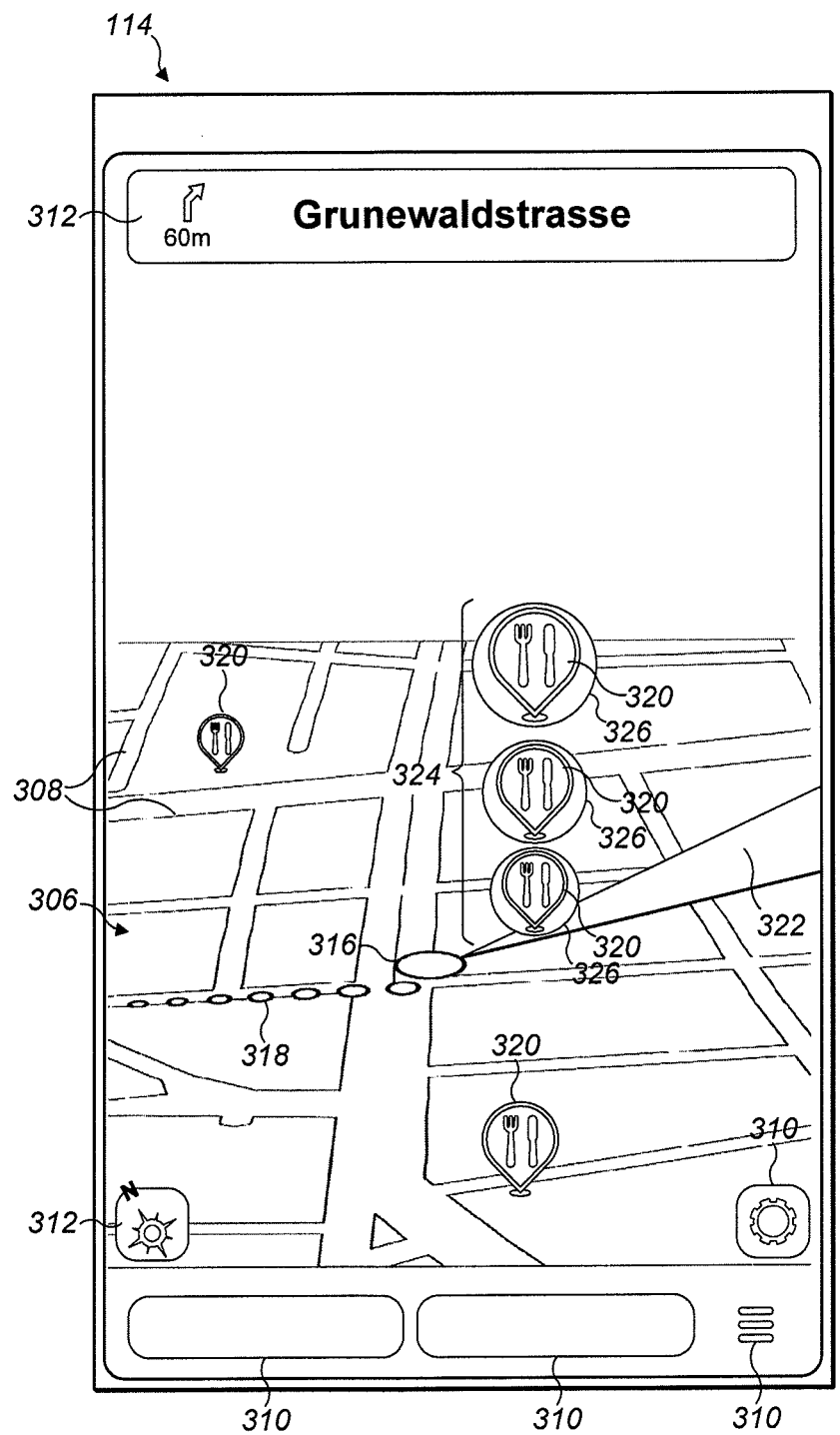
FIG. 4 illustrates a variation of the aspect illustrated in FIG. 3c.

Referring to FIG. 4, where an oblique view of a generally horizontal map surface 306 is displayed, the elements 320 could be expanded such that they appear to extend upwards from the map surface 306, e.g. in a vertical column above their original position. Alternatively, in some examples, the expanded elements 320 could be displayed such that they appear to float above the map surface 306 in some other arrangement, e.g. in a cloud. In this way, the expanded elements 320 may be displayed more prominently and/or with less obscuring of other parts of the map 306. Moreover, the original position of the elements 320 (e.g., at the base of the column) may be indicated more clearly.

In some examples, the user interface 114 may automatically scroll and/or adjust the zoom level of the map so as to enable the expanded stack 324 to be displayed. For example, the original position of the stack 324 may be moved towards the centre or towards a corner of the display 114. In cases where elements 320 from two or more stacks 324 are to be repositioned, the spacing apart of the elements 320 may be performed as described above in relation to all of the elements 320 regardless of which stack 324 they are in. Alternatively, the spacing apart of the elements 320 may be performed in such a way that the elements 320 from one stack 324 are distinguishable from those of another stack 324.

Alternatively, or additionally, the order of the elements 322 in the expanded stack 324 may be determined based upon information associated with the elements 322 and one or more criteria. For example, the order may be determined based upon the category of the element 322, a score relating to potential interest to the user, the score determined from user information, social networking information, etc., or any other appropriate criteria. The criteria may be predefined and/or user-defined.

The user interface 114 may display an indication of which elements 320 have been spaced further apart. For example, the elements 320 may be highlighted as described above. Alternatively or additionally, this indication may be provided by way of the elements 320 being positioned in the indication of the map section 322. If necessary, the indication of the map section 322 may be extended so as to accommodate the repositioned elements 320, as shown in the figure.

The user interface 114 may also display an indication of the original position of the elements 320. For example, this could be a line linking each of the repositioned elements 320 to its original position on the map 306. As shown in the figure, one of the elements 320 in the stack 324 may be kept at the same position and thereby provide an alternative or additional such indication.

Figure 5:
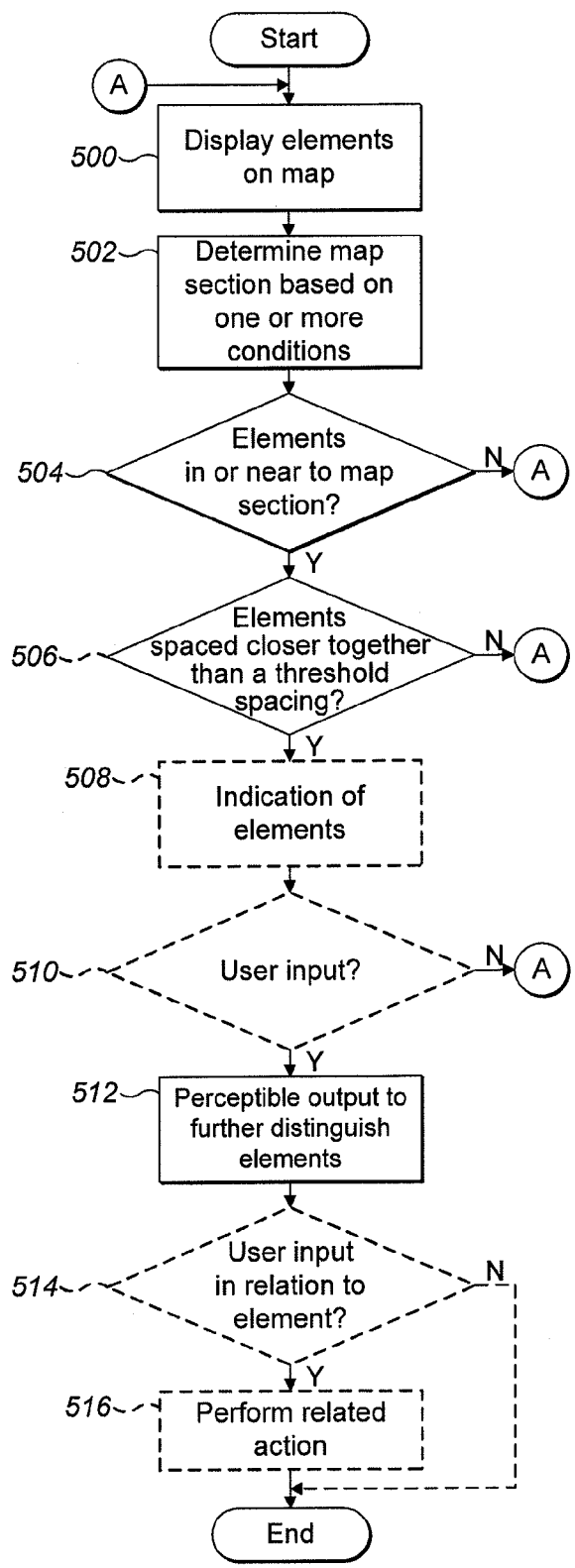
FIG. 5 is an example of a method which may be performed by the controller of the apparatus of FIG. 1.

FIG. 5 is an example of a method which may be carried out by the controller 102 of FIG. 1.

At step 500, the controller 102 causes a plurality of elements 320 to be displayed in respective positions on a map 306. As explained above, the plurality of elements 320 may represent points of interest. The controller 102 may cause the display of the map 306 and/or the plurality of elements 320 to be updated as appropriate, e.g. when the user zooms or scrolls the map 306 or when the current position of the device 200 changes.

At step 502, the controller 102 determines a map section 322 based upon one or more conditions. As explained above, the map section may be thought of as a region of the map 306 that is potentially of interest to the user at a current time. The one or more conditions used to determine the map section 322 may include a position, particularly the current position of the device 200, and a direction, particularly a direction of movement or orientation of the device 200. In some examples, the map section 322 may be one-dimensional or an elongated two- or three-dimensional region starting at or near to the position and extending lengthwise in the direction. In some examples, the controller 102 may display an indication of the map section 322. The controller 102 may update the map section 322 in response to changes in the position and direction. This updating may be smoothed in an appropriate way.

In some examples, the controller 102 may determine the size of the map section 322, particularly its length and/or width, for example based upon the number of elements 320 that are positioned in or near to the map section 322 or upon a user input.

At step 504, the controller 102 determines whether two or more of the elements 320 are positioned in or near to the map section 322. If not, then the controller 102 returns to step 500. If so, then the controller 102 proceeds to the next step.

At step 506, the controller 102 determines that the two or more elements 320 that are positioned in or near to the map section 322 are spaced closer together than a threshold spacing. The threshold spacing may correspond to a predetermined distance between each of the two or more elements 322 and at least one other of the two or more elements 322. If not, then the controller 102 returns to step 500. If so, then the controller 102 proceeds to the next step.

In some examples, at step 508, the controller 102 may display an indication 326 that two or more of the elements 320 are positioned in or near to the map section 322 and are spaced closer together than the threshold spacing.

In some examples, there may also be an indication 328 for prompting the user to make an input. It may be required that the input is made within a predetermined time period or while the two or more elements 320 remain in or near to the map section 322. At step 510, the controller 102 may detect whether the input has been made. If not, then the controller 102 may return to step 500. If so, then the controller 102 may proceed to the next step. In some examples, the controller 102 may detect that the input is made in relation to a particular one or more stacks 324 and the perceptible output is only provided in relation to those elements 320 included in the particular one or more stacks 324 may in the next step.

At step 512, the controller 102 causes a perceptible output to be provided to further distinguish from one another the elements 320 positioned in or near to the map section 322 and spaced closer together than the threshold spacing, in this case by causing them to be spaced further apart. This may involve the controller 102 causing at least one of the elements 320 to be displayed at a different position. As explained above, the elements 320 may be expanded in any appropriate way.

In some examples, at step 514, the controller 102 may detect whether an input has been made in relation to one of the elements 322 in relation to which the perceptible output was provided, and, in response thereto, at step 516, may perform a related action. Such an action could involve, for example, obtaining and displaying further information associated with the element 322. Other such actions could include loading a webpage, sending an email or making a telephone call.

In some examples, the controller 102 may display further information associated with a selected one (e.g. the closest) of the elements 322 in the expanded stack 324 as soon as the stack 324 has been expanded. This further information may include a name, a category of point of interest, whether a business is open or closed, etc. Moreover, the controller 102 may display the information for the one element 322 for a predetermined period of time (e.g. 5 or 10 seconds), and then display the information for a next element 322 in the expanded stack 324, and so on. In this way, the need for the user input (other than maintaining the orientation of the device 200, for example) may be further minimised. The user may change the element 322 for which information is displayed by making an input as described above.

Figure 6A:
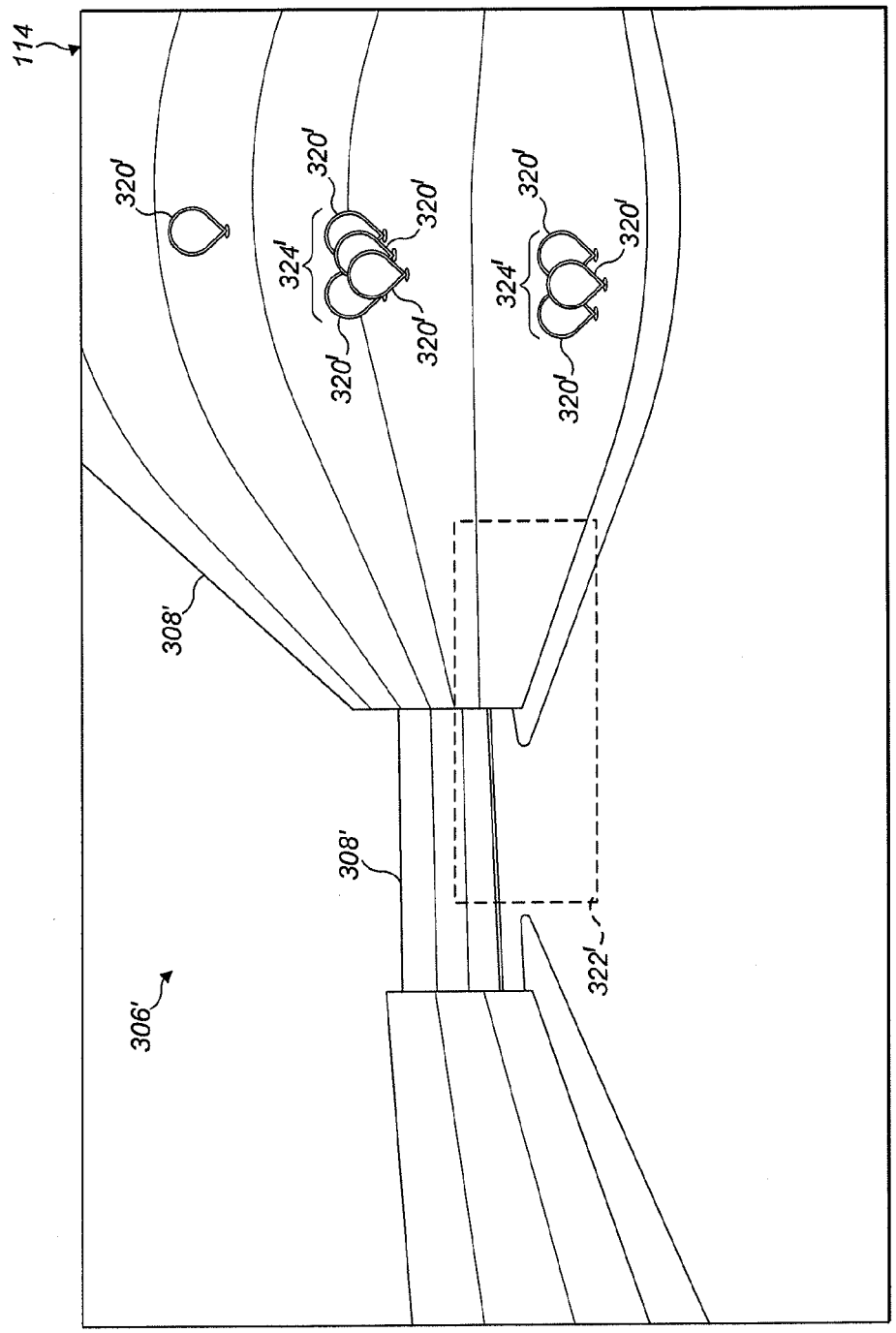

Referring to FIGS. 6a to 6d, a further example embodiment will now be described. This example embodiment is similar to that illustrated in FIGS. 3a to 3c. However, in this instance, the user interface 114 may display a first-person view of a map 306', as shown in FIG. 6a.

In such a view, the basic map elements 308' may be three-dimensional representations. A perspective view of the elements 308' may be displayed, the view depending upon the position and direction of a viewpoint. The viewpoint is generally determined in the same way as the position and direction used to determine the map section 322', which will be described below.

The elements 320' associated with "points of interest" may correspond to a three-dimensional point on the map 306', e.g. an elevation in addition to a latitude and longitude.

In FIG. 6a, a representation 308' of a multi-storey building is displayed. As may be seen, elements 320' are shown on two or more different storeys of the building.

The map section 322' may be determined in the same way as described above. However, in this instance, the map section 322' is three-dimensional and may be determined based upon a three-dimensional position and/or a three-dimensional direction on the map 306'.

The additional elevation information that may be needed to define the three-dimensional position may be obtained from positioning information and/or via a user input. In some instances, it may be assumed that the elevation is zero, e.g. at ground level.

The additional tilt information that may be needed to define the three-dimensional direction may be determined using orientation information from the one or more orientation sensors 118 and/or via a user input.

Once the position and the direction have been determined, the three-dimensional map section 322' may then be determined in any appropriate way. For example, the map section 322' may be an elongated cone or pyramid shape with its apex at or near to the position and its longitudinal axis parallel with the direction.

The user display 114 may display any appropriate indication of the three-dimensional map section 322'. For example, the boundary of the map section 322' may be indicated by a circular or polygonal (e.g. rectangular) area or outline thereof. In FIG. 6a, the indication is a rectangular outline in the centre of the display.

If the viewpoint used to determine the view of the map 306' is determined using the same position and direction information as the map section 322', then the indication of the map section 322' may be in a fixed position on the display 114.

Alternatively, in some examples, the view of the map 306' may be "frozen", that is to say no longer updated in response to changes in the position and/or the direction. This may be in response to a user input, for example. The map section 322' may then be moved around the frozen view of the map 306', for example by the user changing the orientation of the device 200.

Figure 6B:
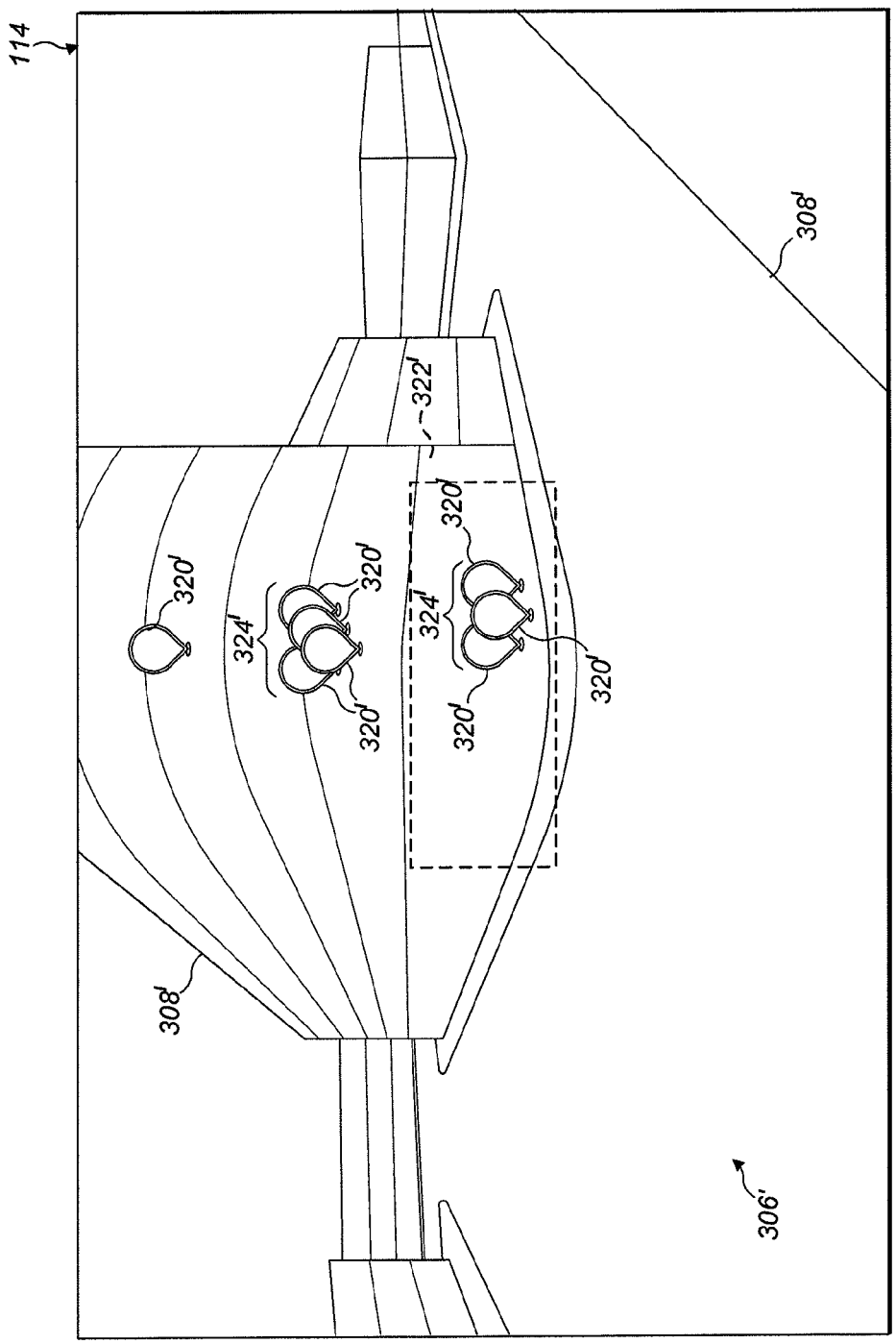

Different elements 320' with the same latitude and longitudinal but with different elevations may be positioned in or near to the map section 322'. As shown in FIGS. 6b and 6c, groups of elements on different storeys of a building may be positioned in the map section 322', for example by the user tilting the device 200.

Figure 6D:
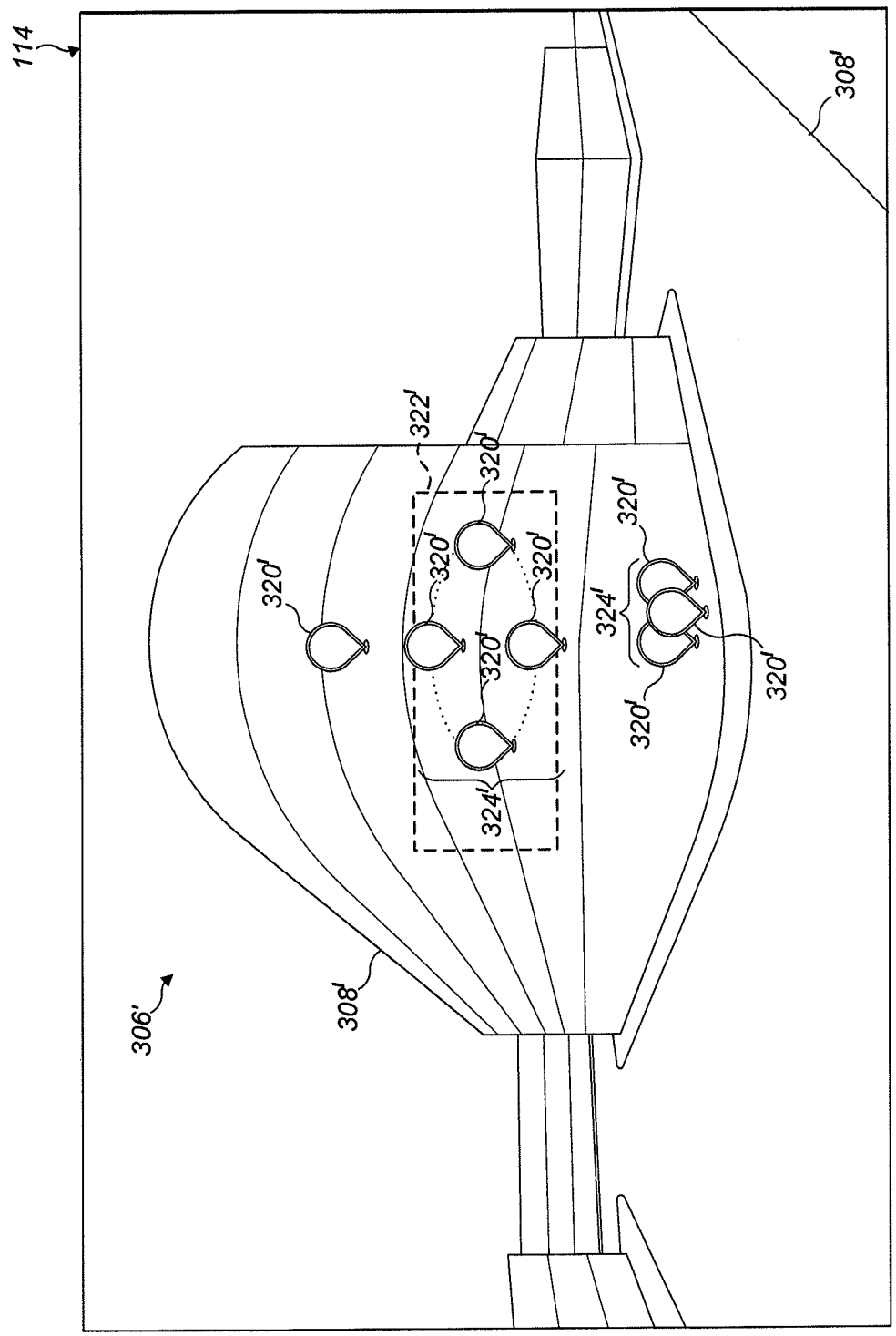

A stack 324' of closely-spaced elements 320' in or near to the map section 322' may be identified and may be expanded in a similar way to that explained above. The repositioned elements 320' may be displayed in a one-dimensional arrangement, e.g. an elliptical line as shown in FIG. 6d, or in a two-dimensional arrangement, e.g. a grid. This arrangement may be centred around the original position of the stack 324', as shown in FIG. 6d, or, alternatively, may be in any other part of the display 114.

In some example embodiments, the map section may be determined based only upon a position. Stacks of closely-spaced elements positioned less than a particular distance in any direction from this position may be expanded. In other words, the map section may be circular or spherical.

Figure 7A:
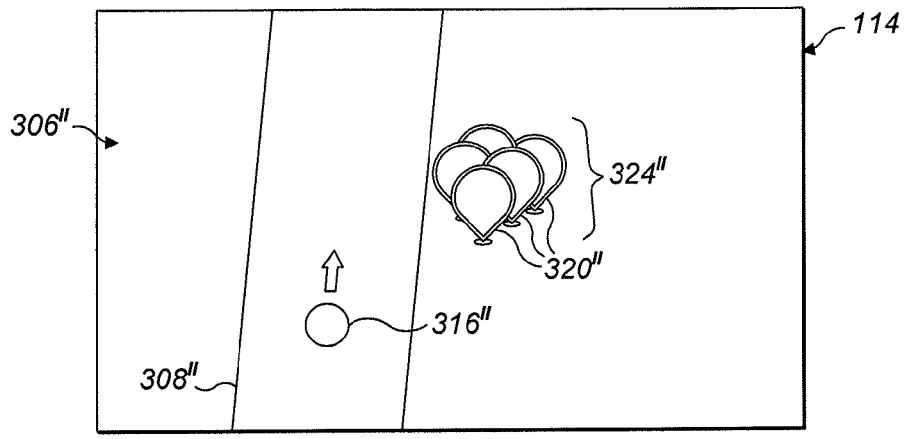
FIGS. 7a, 7b and 7c illustrate aspects of a further method which may be performed by the controller of the apparatus of FIG. 1.
Figure 7B:
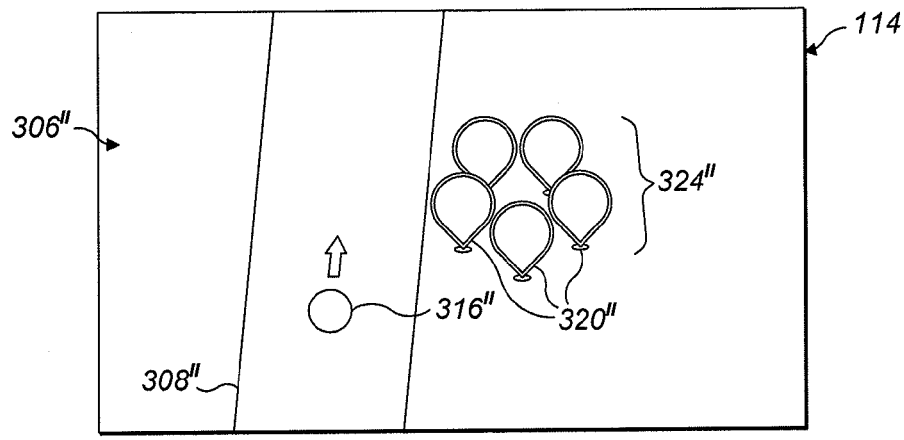
Figure 7C:
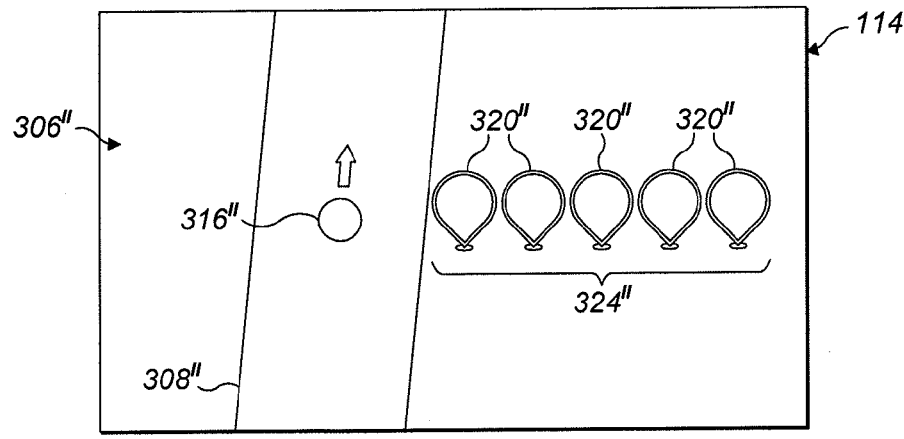

Referring to FIGS. 7a to 7c, such an example embodiment will now be described. The example embodiment is otherwise similar to that illustrated in FIGS. 3a to 3c.

The map section (not shown) is a circular region centred on the current position 316" of the device 200. The size of the map section, e.g. its radius, may be determined in a similar way as described above. An indication of the map section itself need not be displayed.

In FIG. 7a, a stack 324" of closely-spaced elements 320" is not positioned in or near to the map section.

In FIGS. 7b and 7c, the device 200 has moved closer to the stack 324", which has been expanded accordingly.

The expanding may be performed in a gradual manner. In particular, each of the elements 320" in the stack 324" may be gradually moved from its original position to its final position or vice versa, as the distance between the stack 324" and the current position 316" of the device 200 respectively decreases or increases over a range of such distances. The elements 320" may be moved in any appropriate way. For example, as shown in FIG. 7b, initially, the distance between the elements 320" may be uniformly increased. As shown in FIG. 7c, the elements 320" may then be moved so that they are finally arranged along a line. In this way, the initial expanding may provide an indication that a stack 324" is positioned in or near to the map section and may also provide initial information about the elements 320" (e.g., the number of elements 320" and their type). Thus, for example, the user may choose whether or not to move closer to the stack 324".

As will be understood, the example embodiments may facilitate interactions with elements on a map. This is because closely-spaced elements may be expanded to make them more individually visible and/or selectable. Moreover, the expanding may be carried out in a way that is partly or fully automatic. Thus, there may be various advantages over more manual approaches. For example, the expanding may be carried out more quickly and conveniently and without any of the obscuring of the screen that may occur when making an input. Only those closely-spaced elements positioned in or near to a map section may be expanded. Thus, any overcrowding of the display 114 may be avoided. Moreover, the map section may be determined in such a way that it corresponds to a region of the map that is likely to be of interest to the user at a current time. Thus, the expanded elements are also likely to be of interest.

In some examples, as an alternative to, or in addition to, expanding a stack by changing how its elements are displayed, information may be outputted in any other perceptible form allowing the individual elements in the stack to be more easily distinguished from one another. For example, once the stack of closely-spaced elements which is to be "expanded" has been identified as described above, speech synthesis software may be used to output information about each of the individual elements. This information could include, for example, a name, description, etc. In this instance, the user could then make an input in relation to one of the elements by using a voice recognition component of the user interface 114, or in any other appropriate way.

It should be realized that the foregoing embodiments should not be construed as limiting. Other variations and modifications will be apparent to persons skilled in the art upon reading the present application.

For example, although in some of the examples, the map section is determined based upon a position and a direction, this is not necessarily the case. For example, the map section could be determined based upon alternative or additional conditions such as information received via a wireless communication means, a user profile, etc.

Furthermore, although in some of the examples, a stack may be expanded by repositioning at least one of its elements, the individual elements of a stack may be made more individually visible and/or selectable in another way. For example, the appearance of the elements could be changed in any appropriate way.

The disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

What is claimed is:

1. An apparatus comprising:
   at least one processor; and
   at least one memory including computer program code,
   wherein the at least one memory and the computer program code are configured to, with the at least one processor, cause the apparatus:
   to cause a plurality of elements to be displayed in respective positions on a map;
   to determine a section of the map based upon one or more conditions, the one or more conditions comprising at least an orientation of a device and a direction which the device faces, as determined from orientation information;
   to determine that two or more of the elements are positioned in or within a predetermined distance of the section of the map determined based on at least the orientation of the device and the direction which the device faces and are spaced closer together than a threshold spacing;
   in response thereto, to cause a perceptible output to be provided to further distinguish each of the two or more elements from one another; and
   in response to (a) detecting a movement of the device closer to a position associated with at least one of the two or more elements and (b) that at least one of the two or more elements have been positioned in or within a predetermined distance of the section of the map for an amount of time greater than a predetermined period of time, to cause at least one of the two or more elements to be gradually moved such that the two or more elements are positioned further apart from each other relative to their previous positions, wherein the map is automatically modified to enable display of the two or more elements at positions further apart from each other relative to their previous positions.

2. The apparatus according to claim 1, wherein causing the at least one of the two or more elements to be gradually moved comprises gradually expanding at least one stack of elements, wherein only stacks of elements located within the determined section of the map are expanded.

3. The apparatus according to claim 1, wherein the one or more conditions further comprise a position, wherein the position is a current position of a device determined from positioning information and wherein the direction is a direction of movement of the device determined from a position history.

4. The apparatus according to claim 3, wherein the section of the map is one-dimensional or an elongated two- or three-dimensional region starting at or within another predetermined distance of the position and extending lengthwise in the direction.

5. The apparatus according to claim 1, wherein the at least one memory and the computer program code are configured to, with the at least one processor, cause the apparatus:
   to determine the size of the section of the map based upon the number of elements that are positioned in or within the predetermined distance of the section of the map, wherein the size is decreased as the number of elements increases.

6. The apparatus according to claim 1, wherein the threshold spacing corresponds to a predetermined distance between each of the two or more elements and at least one other of the two or more elements.

7. The apparatus according to claim 1, wherein the at least one memory and the computer program code are configured to, with the at least one processor, cause the apparatus:
   in response to determining that the two or more elements are positioned in or within the predetermined distance of the section of the map and are spaced closer together than the threshold spacing, to cause an indication thereof to be displayed;
   to detect a user input; and,
   in response thereto, to cause the perceptible output to be provided.

8. The apparatus according to claim 1, wherein the at least one memory and the computer program code are configured to, with the at least one processor, cause the apparatus:
   in response to determining that the two or more elements are positioned in or within the predetermined distance of the section of the map and are spaced closer together than the threshold spacing, to cause the perceptible output to be provided without any user input.

9. The apparatus according to claim 1, wherein the at least one memory and the computer program code are configured to, with the at least one processor, cause the apparatus:
   to detect a user input in relation to one of the two or more elements in relation to which the perceptible output was provided; and,
   in response thereto, to perform a related action.

10. A method comprising:
    causing a plurality of elements to be displayed in respective positions on a map;
    determining a section of the map based upon one or more conditions, the one or more conditions comprising at least an orientation of a device and a direction which the device faces, as determined from orientation information;
    determining that two or more of the elements are positioned in or within a predetermined distance of the section of the map determined based on at least the orientation of the device and the direction which the device faces and are spaced closer together than a threshold spacing;
    in response thereto, causing a perceptible output to be provided to further distinguish each of the two or more elements from one another; and
    in response to (a) detecting a movement of the device closer to a position associated with at least one of the two or more elements and (b) that at least one of the two or more elements have been positioned in or within a predetermined distance of the section of the map for an amount of time greater than a predetermined period of time, causing at least one of the two or more elements to be gradually moved such that the two or more elements are positioned further apart from each other relative to their previous positions, wherein the map is automatically modified to enable display of the two or more elements at positions further apart from each other relative to their previous positions.

11. The method according to claim 10, wherein causing the at least one of the two or more elements to be gradually moved comprises gradually expanding at least one stack of elements, wherein only stacks of elements located within the determined section of the map are expanded.

12. The method according to claim 10, wherein the one or more conditions further comprise a position, wherein the position is a current position of a device determined from positioning information and wherein the direction is a direction of movement of the device determined from a position history.

13. The method according to claim 12, wherein the section of the map is a one-dimensional or an elongated two- or three-dimensional region starting at or within another predetermined distance of the position and extending lengthwise in the direction.

14. The method according to claim 10, further comprising:
    determining the size of the section of the map based upon the number of elements that are positioned in or within the predetermined distance of the section of the map, wherein the size is decreased as the number of elements increases.

15. The method according to claim 10, further comprising:
    in response to determining that the two or more elements are positioned in or within the predetermined distance of the section of the map and are spaced closer together than the threshold spacing, causing an indication thereof to be displayed;
    detecting a user input; and,
    in response thereto, causing the perceptible output to be provided.

16. The method according to claim 10, comprising:
    in response to determining that the two or more elements are positioned in or within the predetermined distance of the section of the map and are spaced closer together than the threshold spacing, causing the perceptible output to be provided without any user input.

17. The method according to claim 10, further comprising:
    detecting a user input in relation to one of the two or more elements in relation to which the perceptible output was provided; and,
    in response thereto, performing a related action.

18. A non-transitory computer-readable storage medium having stored thereon computer-readable code, which, when executed by a computer apparatus, causes the computer apparatus:
    to cause a plurality of elements to be displayed in respective positions on a map;
    to determine a section of the map based upon one or more conditions, the one or more conditions comprising at least an orientation of a device and a direction which the device faces, as determined from orientation information;
    to determine that two or more of the elements are positioned in or within a predetermined distance of the section of the map determined based on at least the orientation of the device and the direction which the device faces and are spaced closer together than a threshold spacing;
    in response thereto, to cause a perceptible output to be provided to further distinguish each of the two or more elements from one another; and
    in response to (a) detecting a movement of the device closer to a position associated with at least one of the two or more elements and (b) that at least one of the two or more elements have been positioned in or within a predetermined distance of the section of the map for an amount of time greater than a predetermined period of time, to cause at least one of the two or more elements to be gradually moved such that the two or more elements are positioned further apart from each other relative to their previous positions, wherein the map is automatically modified to enable display of the two or more elements at positions further apart from each other relative to their previous positions.

19. The apparatus of claim 1, wherein the perceptible output distinguishes respective elevations of elements on a three-dimensional perspective map in response to a tilt of the device, wherein the two or more elements that are spaced further apart from each other are associated with same elevations.

20. The apparatus of claim 19, wherein at least two of the plurality of elements are associated with a same latitude, a same longitude, and different elevations.

* * * * *

UNITED STATES PATENT AND TRADEMARK OFFICE
CERTIFICATE OF CORRECTION

PATENT NO. : 9,518,836 B2
APPLICATION NO. : 13/486870
DATED : December 13, 2016
INVENTOR(S) : Beaurepaire Page 1 of 1

It is certified that error appears in the above-identified patent and that said Letters Patent is hereby corrected as shown below:

On the Title Page

Item "(75) Inventor: Jerome Beaurepaire, Berlin (GB)"
Should read:
Item --(75) Inventor: Jerome Beaurepaire, Berlin (DE)--

Signed and Sealed this
Second Day of January, 2018

Joseph Matal
*Performing the Functions and Duties of the
Under Secretary of Commerce for Intellectual Property and
Director of the United States Patent and Trademark Office*